United States Patent Office 3,350,992
Patented Nov. 7, 1967

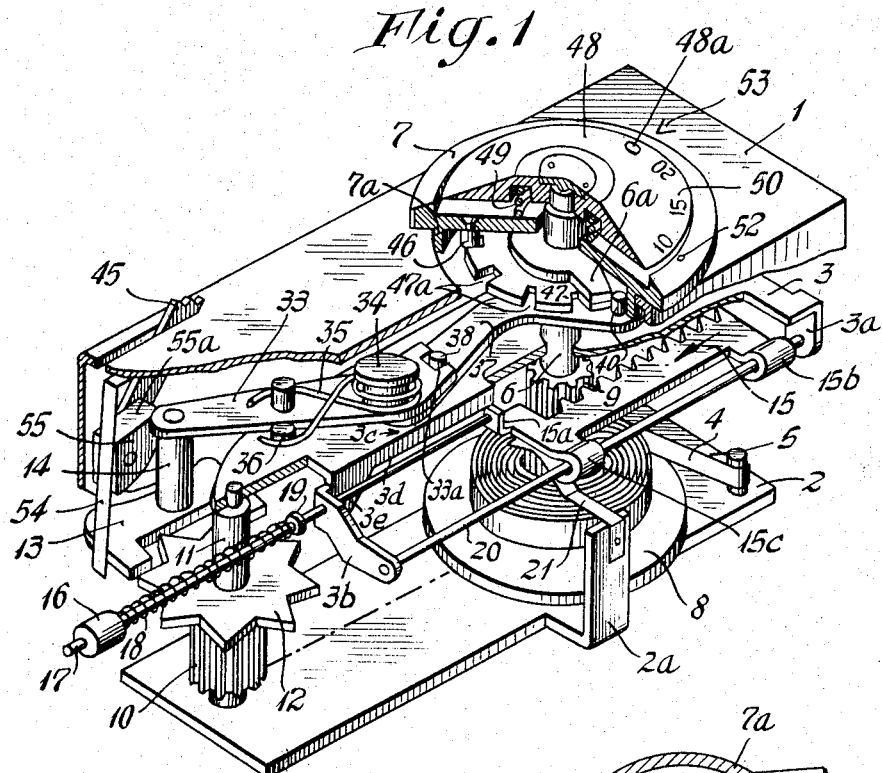

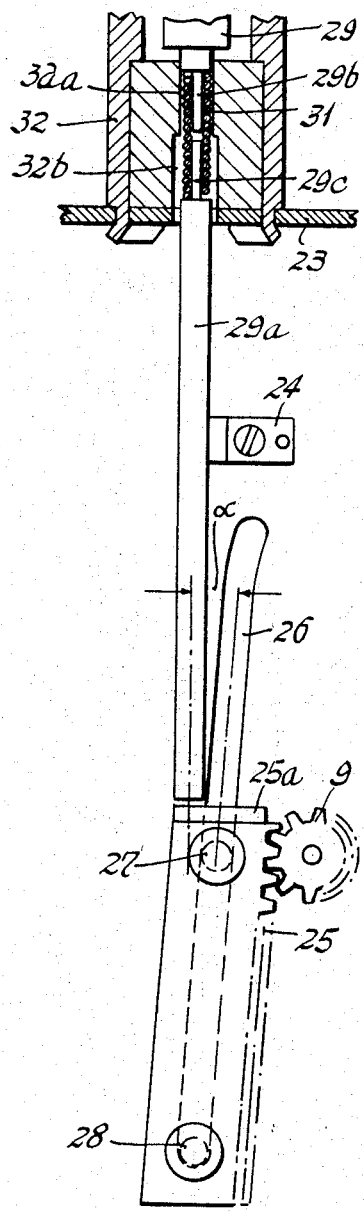
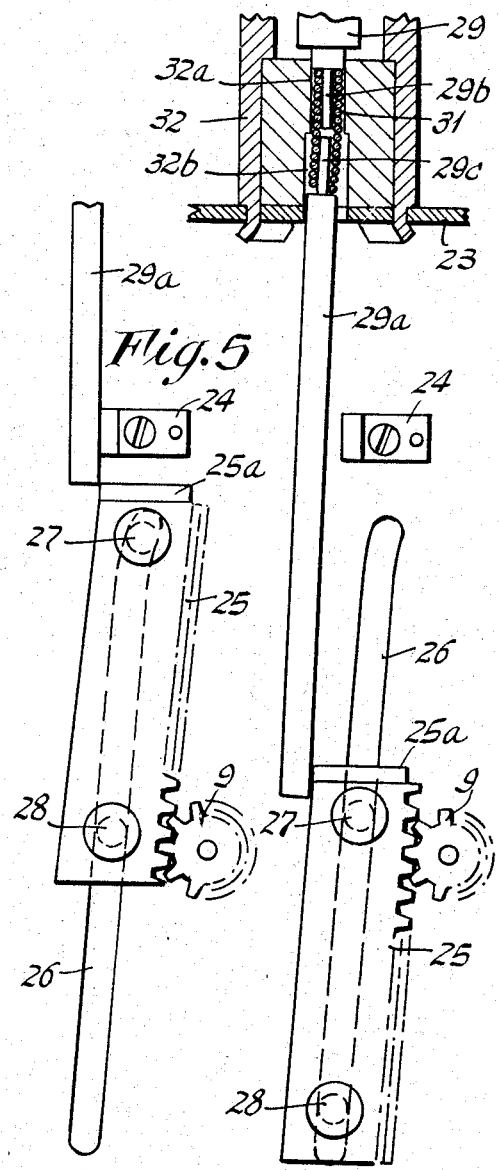

3,350,992
DELAYED ACTION TIMING DEVICE
Franz W. R. Starp and Vladimir Racki, Calmbach (Enz), Germany, assignors to Alfred Gauthier, G.m.b.H., Calmbach (Enz), Germany, a corporation of Germany
Filed Mar. 8, 1965, Ser. No. 437,842
Claims priority, application Germany, Mar. 10, 1964, G 40,057
8 Claims. (Cl. 95—53.3)

ABSTRACT OF THE DISCLOSURE

A delayed action timing device which is attachable to a photographic camera for actuating the shutter release of the camera after preset delay. The device has a push rod for actuating the shutter release of the camera and a rack against which the push button abuts for imparting a longitudinal motion to the push rod to actuate the shutter release when the rack reaches a predetermined release position. Further, means are provided for imparting a longitudinal motion to the rack to drive the push rod, and means are also provided for rotating the rack to disengage it from the push rod when the rack reaches the predetermined release position. In addition, a restoring spring is provided for returning the push rod to its starting position after disengagement of the rack from the push rod.

---

The present invention relates to a delayed action timing device which is attachable to a photographic camera for actuating the shutter release of the camera after preset delay. The device comprises a rack which acts upon a push-rod and causes the release of the push-rod after the rack reaches what may be termed the release position. After release, the push-rod returns to its starting position due to the action of a restoring spring.

It is highly desirable to relieve the camera or shutter release member of the camera of its load immediately after it has been actuated. With this in mind, it is important that in a timing device such as the one described above, the push-rod be returned to its starting position immediately after release is effected. Such an approach will insure that the driving member of the camera shutter remains cocked regardless of whether or not the timing device is cocked. It is well known to those skilled in that art, that to achieve this effect an additional slide, acting on a push-rod in conjunction with the rack may be provided. The rack and the slide are coupled during the run-down of the timing device by means of a releasable driving pawl which is released at the end of the run-down. This well known arrangement is still imperfect and in need of improvement because the operative connection of the timing device with the push-rod requires an excessive amount of space and the various components necessary to effect the desired results are relatively expensive to fabricate and assemble.

It is an object of the present invention to provide a new and improved delayed action timing device.

It is another object of the present invention to provide a delayed action timing device not subject to the shortcomings of the above-described, well-known technique. In this connection, the present invention provides for a delayed action timing device of the character initially considered above which utilizes an operative connection between the timing mechanism and a push-rod without the addition of expensive components.

The present invention provides a solution to the problems mentioned above by arranging the rack, with respect to the push-rod in such a manner that the rack is automatically removed from engagement with the push-rod after the release position of the rack has been reached. The result of this arrangement is that, apart from the rack, no additional movable members, such as slides and coupling pawls, are required to enable the push-rod to return to the starting position after the camera shutter has been released. This, in turn, means that the timing device according to the present invention, will not only be less expensive, but will also be more compact than timing devices presently available or known to those skilled in the art.

A timing device according to the present invention results in a highly dependable unit. Such a device includes a rack which is displaceable longitudinally in one direction as well as being rotatably positioned on a guide rod extending parallel to the direction of motion of the push-rod to be actuated. In its longitudinal movement, the rack is guided along a control edge against which it bears due to the influence of a spring. When the release position is reached, the rack rotates about the guide rod and the operative connection between the rack and the push-rod is broken.

In another embodiment, the rack, acting on the push-rod, is movably positioned and guided at an acute angle $\alpha$ with respect to the direction of displacement of the push-rod. This manner of positioning and guiding makes it possible to reduce the frictional resistances to a minimum, so that the driving force of the timing mechanism is transmitted to the push-rod practically without any losses.

In this arrangement, the push-rod is provided with a joint at the place where it enters its guide bushing, or sleeve. The joint permits a lateral yielding movement of the end of the push-rod in the plane of motion of the rack. According to the invention, a guide element counteracting the lateral pressure component may be associated with the end of the push-rod.

Details of the invention will become apparent from the specification which follows and from the accompanying drawings in which:

FIG. 1 is a perspective view of a delayed action timing device according to the present invention wherein the device is provided with a rotatably movable guided rack and the housing and cocking and setting button of the device are partially cut-away so as to provide a better view of the components;

FIG. 2 is a cross-section view through a control ring arranged on the cocking and setting button during a phase of the operation in which the anchor of the mechanism engages the escapement wheel, the control ring serving to disengage the anchor from the escapement wheel;

FIG. 3 shows the arrangement of FIG. 2, but in a phase of the operation after the anchor has been lifted from the escapement wheel;

FIG. 4 shows a second arrangement for actuating the push-rod by means of a rack arranged to move at an acute angle relative to the direction of movement of the push-rod, the rack being shown in its end position corresponding to the cocked position of the timing mechanism;

FIG. 5 shows the arrangement of FIG. 4 shortly before the push-rod and the rack have reached the release position; and FIG. 6 shows the arrangement of FIG. 4 during the cocking of the mechanism shortly before the rack reaches the cocked position.

Referring to FIG. 1, there is shown a rectangular housing 1, partially cut-away, in which there are provided two parallel spaced bearing plates 2 and 3. Positioned between the bearing plates 2 and 3 is a driving spring 4 having one end thereof wrapped around a fixed pin or stud 5 mounted on the bearing plate 3 and the other end thereof acting on a cocking and driving shaft 6. The driving spring 4 tends to rotate the cocking and driving shaft 6 clockwise. Connected to the shaft 6, but in such a manner as to be releasable from the shaft, is an externally accessible cocking and setting button 7. When connected to the shaft 6, both the button 7 and the shaft 6 rotate together as a unit. The particular details of the connection between the shaft 6 and the button 7 will be described in detail below.

Also connected to the cocking and driving shaft 6, in such a manner as to be rotatable therewith, are two gears 8 and 9. A pinion 10 having a bearing pin or pivot 11 is connected to the gear 8 by way of a gear train not shown, but represented by a dot-dash line. The pinion 10 carries an escapement wheel 12 with which an anchor 13 cooperates in a well known manner. The anchor 13 is swingingly mounted on a pin or pivot 14.

The gear 9, secured to the driving shaft 6, meshes with a rack 15 which serves to actuate a push-rod 17. The push-rod 17 is guided along its longitudinal displacement in a sleeve 16 secured, although not shown in the drawing, to the housing 1. The sleeve 16 may be provided with a threaded portion for receiving a cable release member by means of which connection to a camera may be effected. The push-rod 17 cooperates with the release device (not shown) of the camera in such a manner that the release of the shutter is effected in the end phase of the run-down of the mechanism. Associated with the push-rod 17 is a restoring spring 18 which abuts at one end against the fixed guide sleeve 16 and at the other end against an abutment 19 on the push-rod. The restoring spring 18 acts upon the push-rod 17 in such a manner as to urge the free end of the push-rod against a lug 15a bent off of the main portion of the rack 15. During run-down, the rotary motion of the gear 9 causes the rack 15 to be displaced in the direction of the arrow with the lug 15a driving the push-rod 17 against the force of the restoring spring 18. As already indicated, the displacement is such that the release of the camera shutter takes place in the final phase of the run-down.

Immediately after the release of the camera shutter, the push-rod 17 and the release device of the camera return to their respective starting positions. In order to effect this result, the invention provides that the positioning and guiding of the rack 15 be such that the rack is removed from engagement with the push-rod 17 after the release position has been reached. Specifically, there is provided a rod 20 for guiding the rack 15. The rod 20 is arranged parallel to the direction of motion of the push-rod 17. One end of the rod 20 is inserted into an eye 3a and the other end is inserted into an extension 3b of the plate 3. The rack 15 is articulately connected to the guide rod 20 by means of two eye-like extensions 15b and 15c in such a manner that the rack may be displaced in the direction of motion of the push-rod 17 and yet be rotated about the rod 20. Affixed to an arm 2a which is bent off of the plate 2 is a leaf spring 21 which bears against the underside of the rack 15 and causes the lug 15a of the rack to bear against an edge 3c, termed a control edge, of the plate 3. The control edge 3c has a first portion 3d extending parallel to the direction of displacement of the push-rod 17 and a second obliquely ascending portion 3e adjoining the first portion.

As the mechanism runs down from the cocked position illustrated in FIG. 1, the lug 15a of the rack 15 first slides along the first portion 3d of the control edge 3c, thereby driving the push-rod 17 and moving it into the release position against the action of the restoring spring 18. Shortly before the end of the run-down, the lug 15a reaches the region of the obliquely ascending portion 3e of the control edge 3c. At this point, the rack 15 undergoes a pivoting or rotary movement about the guide rod 20 against the action of the leaf spring 21. When this happens, the lug 15a is removed from engagement with the push-rod 17, thereby enabling the push-rod to return to its starting position due to the action of the restoring spring 18. The teeth on the gear 9 and the rack 15 are so arranged that their engagement is not interrupted by the pivoting motion of the rack 15.

An alternate arrangement to the rack arrangement illustrated in FIG. 1 is shown in FIGS. 4 through 6. Basically, there is provided in the arrangement of FIGS. 4 through 6 a push-rod having a rack which is moved at an acute angle α with respect to the direction of displacement of the push-rod. Referring to FIGS. 4 through 6, the rack 25 meshing with the gear 9 may be longitudinally displaced by means of two guide pins 27 and 28 which are fixed to the rack and move in a control slot 26 provided, for example, in one of the plates 2 or 3. As is apparent from the drawing, the control slot 26 is so disposed that the driving lug 25a of the rack 25 is displaced sidewise or laterally as the push-rod 29 is driven during run-down. The sidewise or lateral displacement of the lug 25 is such that the lug is removed from engagement with the push-rod 29 at the end of the run-down. This condition is illustrated in FIG. 5. Once the driving lug 25a is removed from engagement with the push-rod 29, the push-rod may return to the starting position shown in FIG. 6 due to the action of a restoring spring, not shown in the drawing.

The rack 25 is returned to the end position shown in FIG. 4 by means of the gear 9 during the cocking of the mechanism. During cocking, the end 29a of the push-rod 29 is pushed away laterally by the driving lug 25a of the rack 25, but again engages the front of the driving lug when the cocked position is reached. The lateral yielding of the push-rod 29 is achieved by means of a joint at the point at which the push-rod enters a guide sleeve 32. Specifically, the end 29a of the push-rod 29 may be resiliently affixed to the main section of the push-rod by means of a suitable coil spring 31. The spring 31 is pressed over two cylindrical pins or pivots 29b and 29c on the push-rod members 29 and 29a, respectively, so that the pivots 29b and 29c are firmly connected in the direction of displacement of the push-rod. Alternatively, in order to effect the same result, the driving lug 25a of the rack 25 may be mounted on the rack in such a manner as to be movable transversely with respect to the direction of movement of the rack. In this case, the arrangement of the resilient joint in the push-rod may be dispensed with and the push-rod may be in the form of a single rigid member.

As previously mentioned, the push-rod 29 is guided in the sleeve 32 which is rigidly affixed to a stationary member 23 which may be either one of the bearing plates or the housing of the device. Within the sleeve 32 there are two communicating holes 32a and 32b, the hole 32b having a diameter large enough to provide the end 29a of the push-rod 29 the freedom of motion which is necessary to allow it to execute the yielding movement required during cocking. In order to insure the accurate guidance of the end 29a of the push-rod 29 during release, a fixed guide member 24 is provided which counteracts the lateral motion component as the rack 25 drives the push-rod.

In order to obtain delayed-action times of varying durations, the anchor 13 may be uncoupled or disengaged after a specific preset running time has elapsed. The duration of the run-down is determined by that phase of the run-down during which the anchor 13 is engaged with the escapement wheel 12. If the anchor is moved out of engagement, the effect will be that the mechanism suddenly and abruptly increases its run-down speed and the racks 15 or 25 along with the push-rods 17 or 29, respectively, associated with the racks, are suddenly jolted into the end position and the camera shutter is released.

Referring to FIGS. 1, 2 and 3, the bearing pin or pivot 14 of the anchor 13 is arranged, for the embodiment shown, on a lever 33 which, in turn, is pivotally positioned on a pin or pivot 34 on the plate 3. The spring 35 tends to keep the lever 33 in its end position, which is defined by a fixed stop pin 36. This results in the anchor 14 being in its engaged position. Another lever 37 is rotatably positioned on the pin or pivot 34 coaxially with the lever 33 and is connected to the lever 33 by means of a pin-slot connection 38, 33a. The width of the slot 33a in the lever 33 is so proportioned that the lever 37 is able to execute limited relative motion with respect to the lever 33. The purpose of this motion will be explained below. The lever 37 is provided for the purpose of lifting the anchor 13 out of engagement with the escapement wheel 12 at a point in the run-down which can be determined by appropriately setting the cocking and setting button 7. In addition, the lever 37 retains the anchor 13 in the lifted or disengaged position against the action of the spring 35 acting on the lever 33. For this purpose, the lever 37 carries at its free end a pin 40 which acts in conjunction with a control ring 7a on the underside of the cocking and setting button 7. The wall of the ring 7a is provided with an oblique slot 7b of such size that the pin 40 of the lever 37 is able to pass therethrough freely. The oblique slot 7b is covered by a spring blade 44, one end of which is fixed to the inner wall of the ring 7a, while its free end is bent slightly so that it is spaced from the wall of the ring.

As best illustrated in FIG. 2, when the device is cocked, the pin 40 of the lever 37 is located within the ring 7a. When released for run-down by actuation of a release lever 45, to be described in detail below, the cocking and setting button 7 rotates together with the cocking and driving shaft 6 in the direction of the arrow indicated in FIG. 2. During this movement, the pin 40 of the lever 37 is engaged by the spring blade 44 and passes through the slot 7b to the outside of the ring due initially to the action of the spring blade and subsequently to the cam effect of the slot itself. This imparts a clockwise pivoting movement to the levers 33 and 37 with the result that the anchor 13 is disengaged from the escapement wheel 12 and the run-down is abruptly accelerated.

The cocking and setting button 7 is positioned on the cocking and driving shaft 6 so that it may rotate with the shaft and yet it is displaceable axially from the shaft. In order to be driven by the cocking and driving shaft 6, the cocking and driving button 7 carries a downwardly extending pin 46 which engages notches 47a on the perimeter of a disc 47 which is firmly affixed to the cocking and driving shaft 6. A coil spring 49 is arranged between the button 7 and a covering disc 48 affixed to the free end of the shaft 6. The spring 49 serves to retain the cocking and setting button 7 in the axial position illustrated in FIG. 1 in which the pin 46 is in engagement with one of the notches 47a in the disc 47. This connection between the cocking and driving shaft 6 and the cocking and setting button 7 may be broken by simply pulling the button 7 outward axially. When this is done, the cocking and setting button 7 is freely movable on the cocking and driving shaft 6 and can be set at different relative positions with respect to the cocking and driving shaft 6 which itself remains in its starting position. Accordingly, the covering disc 48 carries a scale 50 having several numerical values which is used in conjunction with the mark 52 set on the cocking and setting button 7. The numerical values "10," "15," "20" in the scale 50, only partially shown in FIG. 1, serve to indicate the duration of the delayed-action time that is to be developed. Specifically, the values in the scale 50 indicate the lapse of time, measured in seconds from the start of run-down, after which the anchor escapement is released and the push-rod 17 is thereby released.

The device just described operates and functions in the following manner. In order to set the mechanism into its cocked position, the cocking and setting button 7 is rotated in the direction of the arrow indicated in FIG. 3 until a marking 48a on the covering disc 48 is opposite a fixed mark 53 or until a stop arm 6a, rigidly affixed to the cocking and driving shaft 6, impinges upon a fixed counter-stop not shown in the drawing. While this takes place, the driving spring 4 is placed under increased tension and the rack 15 is moved into the end position illustrated in FIG. 1. During cocking, the pin 40 of the lever 37 is pulled through the oblique slot 7b into the ring 7a because of the direction of slope of the slot 7b, with the result that the anchor 13 occupies such a position that it is in engagement with the escapement wheel 12. However, as seen from FIG. 1, the anchor 13 cannot, in this condition, pivot or swing since it is retained by a leaf spring 54 which is secured to the housing 1 and is designed to arrest the mechanism in the cocked position. In order to be able to cock the driving spring 4 by rotating the cocking and driving shaft 6 when the mechanism is arrested, a one-way drive coupling, for example in the form of a conventional ratchet or friction coupling or clutch, may be provided between the cocking and driving shaft 6 and the gears of the mechanism. In this case, the gear 8 as well as the escapement wheel 12 maintain their position during the cocking step.

When the mechanism is cocked, the cocking and setting button 7 may occupy different setting positions with respect to the scale 50. The cocking and setting button 7 is set in FIG. 1 at the value "10" which means that the running time of the mechanism with anchor escapement is 10 seconds. If the desired run-down time is to be shorter or longer than 10 seconds, all that is necessary is that the connection between the cocking and driving shaft 6 and the cocking and setting button 7 be broken by moving the button axially and then turning the button until the setting mark 52 is opposite the numerical value on the scale 50 which corresponds to the desired run-down time. After the setting has been effected, the cocking and setting button 7 is again released, whereupon it returns to the axial position illustrated in FIG. 1 due to the action of the spring 49. In this position, the button 7 and the shaft 6 are again so connected as to be non-rotatable relative to each other. If the release lever 45 is now moved from the position shown in FIG. 1 to the left in order to release the cocked mechanism, the edge 55a of an indexing member 55 which is connected to the release lever 45 and non-rotatable therewith, lifts the leaf spring 54 off of the anchor 13 so that the anchor is able to swing outward.

During the subsequent run-down, which initially takes place while the anchor 13 exerts its arresting effect, the cocking and setting button 7 rotates together with the cocking and driving shaft 6 in a clockwise direction, while the rack 15, which is in engagement with the gear 9 of the cocking and driving shaft 6, is displaced to the left in the direction of the arrow indicated in FIG. 1. During this movement, the anchor 13 is decoupled from the escapement wheel 12 in the manner described above by means of the oblique slot 7b in the ring 7a of the cocking and setting button 7. The mechanism released by the anchor escapement continues to run down with increased speed and reaches its end position after a running time of a few milliseconds. The release of the camera shutter is effected by means of the pushrod 17 during this phase of the movement. The lug 15a of the rack then enters the region of the obliquely ascending portion 3e of the control edge 3c with the result that the lug 15a is removed from engagement with the push-rod 17 and the push-rod returns to its starting position due to the action of the restoring spring 18.

In the mechanism just described, different delayed action times may be obtained due to the fact that the oblique slot 7b of the cocking and setting button 7 can be set at different relative positions with respect to the pin 40 with which the button 7 cooperates. Depending upon this setting, the cocking and driving shaft 6 of the mechanism is able to travel, after being released, a longer or shorter path of rotation, until the pin 40 enters the oblique slot 7b and thereby decouples or disengages the anchor 13.

When delayed-action times of longer duration are set, the spring blade 44 will be located under the pin 40 when the mechanism is in its cocked condition. The pin 40 is thereby lifted slightly and its lever 34 is caused to execute a small pivoting motion in a counter-clockwise direction. While this takes place, the lever 33 remains idle, since the pin-slot connection 38, 33a is so arranged that it allows for relative movement of the lever 37 with respect to the lever 33.

While there has been described what is at present considered to be the preferred embodiment of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A delayed action timing device attachable to a camera and comprising:
    a push-rod for actuating the shutter release of said camera;
    a rack against which said push-rod abuts for imparting a longitudinal motion to said push-rod to actuate said shutter release when said rack reaches a predetermined release position;
    means for imparting a longitudinal motion to said rack to drive said push-rod;
    means for rotating said rack to disengage it from said push-rod when said rack reaches said predetermined release position;
    and a restoring spring for returning said push-rod to its starting position after disengagement of said rack from said push-rod.

2. The apparatus of claim 1 wherein the rack is so mounted as to be rotatable about a pivot axis parallel to the longitudinal motion thereof.

3. The apparatus of claim 2 wherein the disengaging means include a contoured surface against which the rack bears as it undergoes its longitudinal motion, said surface having such as shape that when said rack reaches the predetermined release position rotational movement about the pivot axis is imparted to said rack.

4. A delayed action timing device attachable to a camera and comprising:
    a push-rod for actuating the shutter release of said camera;
    a rack against which said push-rod abuts movable longitudinally and rotatably about a pivot axis parallel to said longitudinal motion for imparting a longitudinal motion to said push-rod to actuate said shutter release when said rack reaches a predetermined release position in its longitudinal motion;
    means for imparting a longitudinal motion to said rack to drive said push-rod;
    a contoured surface against which said rack bears as it undergoes its longitudinal motion, said surface having such a shape that when said rack reaches said predetermined release position rotational movement about said pivot axis is imparted to said rack, thereby disengaging said rack from said push-rod;
    a first spring acting on said rack for forcing said rack to bear against said contoured surface;
    and a second spring for returning said push-rod to its starting position after disengagement of said rack from said push-rod.

5. The apparatus of claim 1 wherein the longitudinal motion of the rack is at an acute angle with respect to the longitudinal motion of the push-rod.

6. The apparatus of claim 5 wherein the push-rod is composed of two rigid rods resiliently joined together at their ends, thereby permitting lateral yielding of said push-rod transverse to the longitudinal motion of the rack.

7. The apparatus of claim 6 wherein there is additionally included a rigidly fixed guide member against which the push-rod bears as it is moved to actuate the shutter release, thereby counteracting the lateral yielding of the push-rod.

8. The apparatus of claim 5 wherein the rack includes a driving lug against which the push-rod abuts which is movable transverse to the longitudinal motion of the rack.

References Cited

UNITED STATES PATENTS

| | | | |
|---|---|---|---|
| 1,159,169 | 11/1915 | Brown | 95—53.3 |
| 2,503,736 | 4/1950 | Hodges | 95—53.6 X |

JOHN M. HORAN, *Primary Examiner.*